US009043350B2

(12) United States Patent
Tomko et al.

(10) Patent No.: US 9,043,350 B2
(45) Date of Patent: May 26, 2015

(54) PROVIDING TOPIC BASED SEARCH GUIDANCE

(75) Inventors: Daniel Jason Tomko, Bellevue, WA (US); Vikas Rajvanshy, Clyde Hill, WA (US); Michael Gradek, White Plains, NY (US); John Lynn, San Francisco, CA (US); William J. Pardi, Edgewood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 656 days.

(21) Appl. No.: 13/239,971

(22) Filed: Sep. 22, 2011

(65) Prior Publication Data

US 2013/0080460 A1    Mar. 28, 2013

(51) Int. Cl.
 *G06F 17/00* (2006.01)
 *G06F 17/30* (2006.01)

(52) U.S. Cl.
 CPC .... *G06F 17/30864* (2013.01); *G06F 17/30672* (2013.01); *G06F 17/30991* (2013.01); *G06F 17/30646* (2013.01)

(58) Field of Classification Search
 None
 See application file for complete search history.

(56) References Cited

U.S. PATENT DOCUMENTS

| | | | |
|---|---|---|---|
| 7,502,786 B2 | 3/2009 | Liu et al. | |
| 7,523,099 B1 * | 4/2009 | Egnor et al. | 1/1 |
| 7,657,519 B2 | 2/2010 | Anderson et al. | |
| 7,836,044 B2 | 11/2010 | Kamvar et al. | |
| 7,917,528 B1 | 3/2011 | Dave et al. | |
| 8,452,798 B2 * | 5/2013 | Myaeng et al. | 707/768 |
| 8,595,250 B1 * | 11/2013 | Egnor et al. | 707/758 |
| 2005/0144162 A1 | 6/2005 | Liang | |
| 2005/0289140 A1 * | 12/2005 | Ford et al. | 707/5 |
| 2006/0259479 A1 * | 11/2006 | Dai | 707/4 |
| 2007/0088686 A1 * | 4/2007 | Hurst-Hiller et al. | 707/4 |

(Continued)

FOREIGN PATENT DOCUMENTS

| | | |
|---|---|---|
| CN | 1716244 A | 1/2006 |
| CN | 1755687 A | 4/2006 |

(Continued)

OTHER PUBLICATIONS

Reynolds, et al., "A Query Refinement Model for Exploratory Semantic Search", In Technical Report HPL-2009-167, HP Laboratories, Jul. 21, 2009, 17 pages.

(Continued)

*Primary Examiner* — Hung Le
(74) *Attorney, Agent, or Firm* — David Andrews; Jessica Meyers; Micky Minhas (57) ABSTRACT

Methods, systems, and computer-readable media for providing topical search suggestions are provided. Topical search suggestions allow a user to receive search results related to the designated topic or subject matter. The present invention may generate multiple topics based on search input provided by a user. The search input may be a search prefix that includes one or more words entered into the search query box before the completed search query is submitted to the search engine. A search interface then presents the topics derived from the search prefix to a user before the user submits the query. In another embodiment, the user designates multiple search inputs. The present invention generates search results based on the search inputs and then presents topics extracted from the search results. In one embodiment, the topics are extracted by performing a natural language analysis of search result metadata.

20 Claims, 6 Drawing Sheets

(56) References Cited

U.S. PATENT DOCUMENTS

| | | | |
|---|---|---|---|
| 2007/0226189 A1 | 9/2007 | Piekos et al. | |
| 2008/0071771 A1 | 3/2008 | Venkataraman et al. | |
| 2008/0120276 A1 | 5/2008 | Chennavasin | |
| 2008/0154859 A1 | 6/2008 | Chi et al. | |
| 2008/0189264 A1* | 8/2008 | Cochran | 707/5 |
| 2008/0235209 A1* | 9/2008 | Rathod et al. | 707/5 |
| 2009/0043741 A1 | 2/2009 | Kim | |
| 2009/0100036 A1* | 4/2009 | Bedrax-Weiss et al. | 707/5 |
| 2009/0125491 A1* | 5/2009 | Gates et al. | 707/3 |
| 2009/0271374 A1* | 10/2009 | Korn et al. | 707/3 |
| 2010/0005092 A1 | 1/2010 | Matson | |
| 2010/0036832 A1* | 2/2010 | Griffith et al. | 707/5 |
| 2010/0082610 A1 | 4/2010 | Anick et al. | |
| 2010/0131902 A1 | 5/2010 | Teran et al. | |
| 2010/0146012 A1* | 6/2010 | Beaudreau et al. | 707/803 |
| 2010/0228777 A1* | 9/2010 | Imig et al. | 707/772 |
| 2010/0262603 A1* | 10/2010 | Odom et al. | 707/728 |
| 2010/0287175 A1* | 11/2010 | Beaudreau et al. | 707/759 |
| 2011/0047161 A1* | 2/2011 | Myaeng et al. | 707/740 |
| 2011/0093488 A1* | 4/2011 | Amacker et al. | 707/767 |
| 2011/0196875 A1 | 8/2011 | Vadlamani et al. | |
| 2011/0313990 A1* | 12/2011 | Valdes-Perez et al. | 707/706 |
| 2012/0078936 A1* | 3/2012 | Kuo et al. | 707/766 |
| 2012/0185507 A1* | 7/2012 | Paparizos et al. | 707/774 |
| 2013/0226690 A1* | 8/2013 | Gross | 705/14.41 |
| 2013/0290291 A1* | 10/2013 | Loofbourrow et al. | 707/708 |
| 2014/0108376 A1* | 4/2014 | Batali et al. | 707/708 |

FOREIGN PATENT DOCUMENTS

| | | |
|---|---|---|
| CN | 100481077 C | 4/2009 |
| JP | 2010176360 A | 8/2010 |

OTHER PUBLICATIONS

Strohmaier, et al., "Intentional Query Suggestion: Making User Goals More Explicit During Search", In proceedings of the 2009 workshop on Web Search Click Data, Feb. 9-12, 2009, 7 pages.

Fan, et al., "Suggesting Topic-based Query Terms as you Type", In proceedings of the 2010 12th International Asia-Pacific Web Conference, Apr. 6-8, 2010, 7 pages.

Nandi, et al., "Assisted Querying using Instant-response Interfaces", In proceedings of the 2007 ACM SIGMOND international conference on Management of data, Jun. 11-14, 2007, 3 pages.

International Search Report and Written Opinion dated Jan. 31, 2013 regarding PCT/US2012/056777, 10 pages.

"First Office and Search Report Issued in China Patent Application No. 201210355650.9", Mailed Date: Dec. 25, 2014, 13 Pages.

"Supplementary Search Report Issued in European Patent Application No. 12834033.8", Mailed Date: Mar. 27, 2015, 7 Pages.

* cited by examiner

PROVIDING TOPIC BASED SEARCH GUIDANCE

BACKGROUND

Users are able to locate relevant websites and other content using a search engine. There are different types of searches. Some searches seek a particular answer to a question (e.g., what is the largest city in Kansas?) and other searches seek to learn about a topic (e.g., how does a space elevator work?). Users may struggle to formulate queries that return search results that are helpful. Some search engines suggest popular queries (based on previous queries submitted to the search engine) that a user can submit instead of writing their own query. However, the popular queries are often related to the same topic or subject matter and produce similar results. The popular queries do not help the user formulate a query that returns search results related to comparatively unpopular topics.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide topical search suggestions and/or feedback. Topical search suggestions allow a user to designate a topic or subject matter to be searched in combination with a query or instead of a query. The present invention may generate multiple topics based on search input provided by a user. In one embodiment, the search input is a search prefix that includes one or more words entered into the search query box before the completed search query is submitted to the search engine. A search interface then presents the topics derived from the search prefix to a user. The interface may display the topics in a dropdown box that allows the user to select one of the topics instead of completing the query. Embodiments of the present invention may also present auto-complete query suggestions and a corresponding topic.

In one embodiment, the user designates multiple search inputs. The search inputs may be text within a web page designed by the user as search input. The search inputs could be multiple search queries submitted during a search session. The present invention generates search results based on the search inputs and then presents topics extracted from the search results. In one embodiment, the topics are extracted by performing a natural language analysis of search result metadata. The metadata may include a search result's uniform resource locator ("URL"), title, and summary text (i.e., a small excerpt shown with the search result).

BRIEF DESCRIPTION OF THE DRAWINGS

Embodiments of the invention are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention compute and present potential topical search suggestions and/or feedback. Topical search suggestions allow a user to designate a topic or subject matter to be searched in combination with a query or instead of a query. The present invention may generate multiple topics based on search input provided by a user. In one embodiment, the search input is a search prefix that includes one or more words entered into the search query box before the completed search query is submitted to the search engine. A search interface then presents the topics derived from the search prefix to a user. The interface may display the topics in a dropdown box that allows the user to select one of the topics instead of completing the query. Embodiments of the present invention may also present auto-complete query suggestions and a corresponding topic.

In one embodiment, the user designates multiple search inputs. The search inputs may be text within a web page designed by the user as search input. The search inputs could be multiple search queries submitted during a search session. The present invention generates search results based on the search inputs and then presents topics extracted from the search results. In one embodiment, the topics are extracted by performing a natural language analysis of search result metadata. The metadata may include a search result's uniform resource locator ("URL"), title, and summary text (i.e., a small excerpt shown with the search result).

In one aspect, a method of generating topical query suggestions is provided. The method includes receiving a search query and generating a preliminary set of search results for the search query. The method also comprises extracting topics from the set of search results. The method also comprises outputting the topics for display before the preliminary search results are output for display and receiving a selection of an individual topic within the topics. The method also comprises outputting for display a subset of search results from the preliminary set of search results that are associated with the individual topic.

In another aspect, a method of generating topical query suggestions from a search prefix is provided. The method includes receiving a search prefix. The search prefix is a group of characters entered by a user into a search interface. The search prefix is one or more characters less than a complete search query. The method also comprises generating an auto-complete query that is based on the search prefix. The method also comprises generating a set of search results for the auto-complete query. The method also comprises extracting topics from the set of search results. The method also comprises outputting the topics for display and selection by a user.

In another aspect, a method of generating topical query suggestions in response to multiple search inputs is provided. The method includes receiving multiple search inputs from a user that are all part of a search session and, for each search input, generating a set of search results. The method also includes extracting topics from each set of search results. The method also includes identifying one or more common topics that were extracted from at least two of the sets of search results. The method also includes outputting the one or more common topics for display. The method also includes receiving a selection of an individual topic within the one or more common topics. The method also includes outputting for display a subset of search results from the set of search results that are associated with the individual topic.

Having briefly described an overview of embodiments of the invention, an exemplary operating environment suitable for use in implementing embodiments of the invention is described below.

Exemplary Operating Environment

Figure 1:
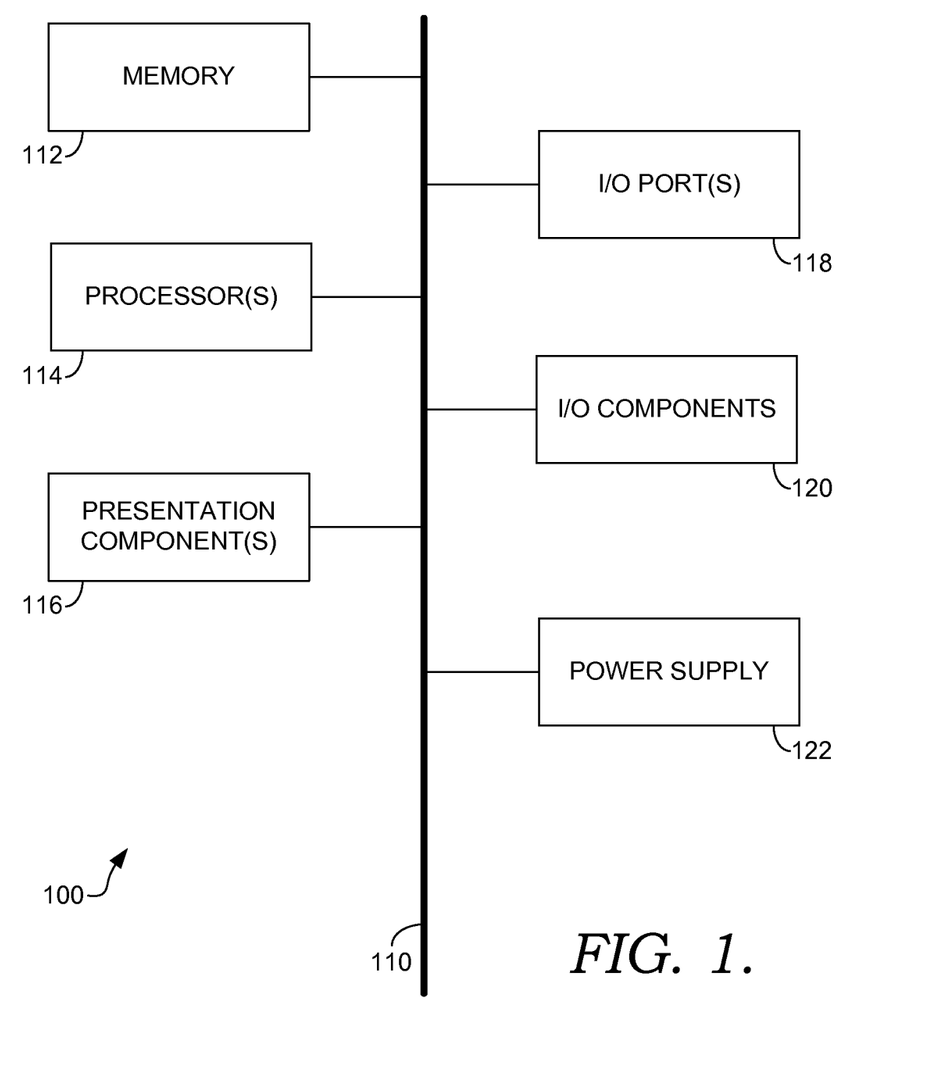
FIG. 1 is a block diagram of an exemplary computing environment suitable for implementing embodiments of the invention.

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices. The computer-storage media may be nontransitory.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary System Architecture

Figure 2:
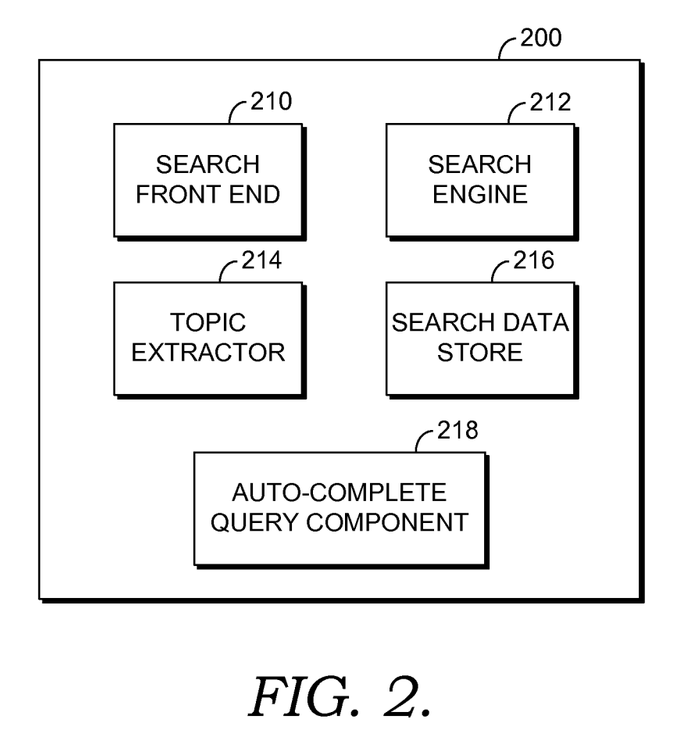
FIG. 2 is a diagram of a computing system architecture suitable for generating topical query suggestions, in accordance with an embodiment of the present invention.

Turning now to FIG. 2, an exemplary computing system architecture 200 suitable for generating topical query suggestions is shown, in accordance with an embodiment of the present invention. The computing system architecture 200 shown in FIG. 2 is an example of one suitable computing system architecture 200. The computing system architecture 200 comprises on one or more computing devices similar to the computing device 100 described with reference to FIG. 1. The computing system architecture 200 should not be interpreted as having any dependency or requirement related to any single module/component or combination of modules/components illustrated therein. The computing system architecture 200 includes a search front end 210, a search engine 212, a topic extractor 214, a search data store 216, and an auto-complete query component 218.

The search front end 210 generates a search interface through which a user inputs search criteria and receives search results. The search interface may be communicated over a network, such as the Internet, and displayed on a browser operating on a client device. In another embodiment, the search interface may interact with a search tool bar. The search front end 210 interacts with the search engine 212 to receive search results that are output for display to the user. The search front end 210 may communicate a search query to the search engine and receive a set of search results from the search engine 212. The search front end 210 may communicate with other components such as the topic extractor 214.

The topic extractor 214 may communicate a series of topics related to a query to the search front end 210. These topics may be presented for selection by a user within the interface generated by the search front end 210. The search front end 210 may also communicate with other components that are not shown within computing system architecture 200. For example, the search front end 210 may communicate with an advertising engine that provides advertisements to be presented on a search results page. The search front end 210 may communicate a user-selected topic to the advertising engine and receive advertisements that related to the user-selected topic.

The search engine 212 receives search queries and generates search results to the user. The search engine may include crawlers that explore available content and create an index that may be used to identify relevant content in response to search queries. The search engine may also rank search results based on relevance or responsiveness to a query. The search queries results shown in response to the search queries, and user interactions with these results may be stored within the search data store 216. The search data store 216 may also include the previously mentioned search indices, as well as other datasets generated by components shown or not shown in FIG. 2. In addition to the search engine 212, other components may read from and write data to the search data store 216.

The topic extractor 214 extracts topics from various content. For example, the topic extractor 214 is able to extract topics from web pages. In one embodiment, the search engine 212 sends a set of search results, comprising web pages, to the topic extractor 214. The topic extractor 214 analyzes the web pages to extract key words, entities, and determine a topic that is associated with the web page. A topic is a subject-matter category associated with the web page. Once the topic extractor 214 has ascertained one or more topics for the web pages, these topics may be communicated to the search front end 210, which displays them to a user for selection.

The topics may be extracted using natural language processing techniques like TF-IDF (term frequency, inverse document frequency) that can be used to determine a list of keywords or likely topics for each page. The most frequently extracted topics across the multiple pages may be presented to the user for query assistance. The topic extractor 214 may maintain an index that identifies topics and the web page from which they are extracted. Once a topic is selected by a user, the index may be used to return search results that are associated with the topic.

In one embodiment, the topic extractor 214 analyzes only a web page's metadata to determine a topic, for example a uniform resource locator ("URL"), summary text (i.e., a small excerpt shown with the search result), and title. In this embodiment, the remaining content of the web page is not analyzed by the topic extractor to determine the subject matter or topic of the web page.

The auto-complete component 218 receives a search prefix and attempts to generate suggested queries based on the search prefix. The search prefix includes characters submitted by a user in a search interface prior to selecting or submitting the search. The prefix may be less than a full word or as little as a single letter. In other embodiments, the prefix may include multiple words. In another embodiment, the prefix may include a few words as well as an incomplete word. The auto-complete component 218 generates suggested queries and presents these to the user for possible selection. As additional characters are entered by a user, the prefix may change and the auto-complete component 218 may change the suggested queries in accordance with the additional characters received. The auto-complete component 218 may attempt to match a search prefix with queries that were frequently submitted by other users previously. The auto-complete component 218 may communicate one or more auto-complete queries to the search engine 212, which generates search results that are communicated to the topic extractor 214. In this way, topics are generated for presentation to the user before the search query is completed.

Figure 3:
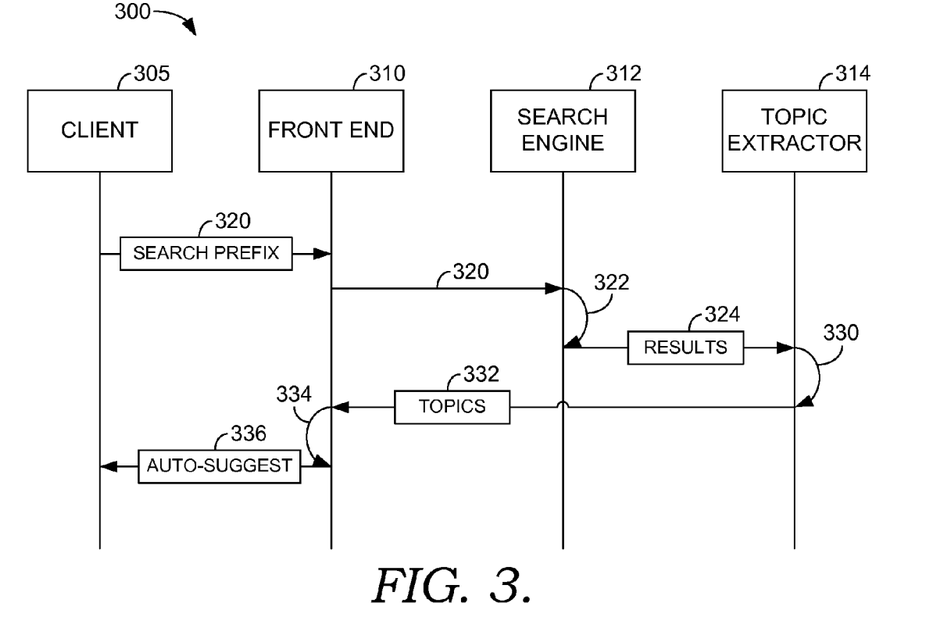
FIG. 3 is a diagram of communications occurring between components in a computing environment that generates topical query suggestions, in accordance with an embodiment of the present invention.

Turning now to FIG. 3, communications that enable topics to be displayed to a user in a search interface are shown, in accordance with an embodiment of the present invention. The computing environment 300 includes a client device 305, a front end 310, a search engine 312, and a topic extractor 314. The client device 305 may be a computing device similar to computing device 100 described previously with reference to FIG. 1. Exemplary devices include a laptop, desktop, tablet, smart phone, and a television. The client device 305 may be communicatively coupled to the other components via a network, such as the Internet.

The search front end 310 may be similar to the search front end 210 described previously with reference to FIG. 2. The search engine 312 may be similar to the search engine 212 described previously with reference to FIG. 2. The topic extractor 314 may be similar to the topic extractor 214 described previously with reference to FIG. 2.

Initially, the client device 305 communicates a search prefix 320 to the search front end 310. The search prefix 320 may be a series of characters that start to form a search query. The search prefix 320 may include characters entered into a search interface prior to submitting a completed search query. The search front end 310 passes the search prefix 320 along to search engine 312.

The search engine 312 generates 322 a series of search results that are responsive to the search prefix. The search engine may first communicate the search prefix 320 to an auto-complete component (not shown) that generates full queries based on the search prefix. A full query may match or partially match the search prefix. One or more of the full queries may be used to generate search results. The search results 324 are then generated using the one or more full queries. These results 324 are communicated from the search engine 312 to the topic extractor 314. The topic extractor 314 extracts 330 topics 332 from the search results 324. As mentioned previously, the topic extractor 314 may use a natural language processing method to extract topics from the results.

The topics 332 are communicated from the topic extractor 314 to the search front end 310. The search front end 310 then integrates 334 the topics into a query assistance feature that may be similar to the one described subsequently in FIG. 4. The help feature is then communicated as an auto suggest 336 to the client device 305. A user of the client device 305 may select one or more of the topics.

Figure 4:
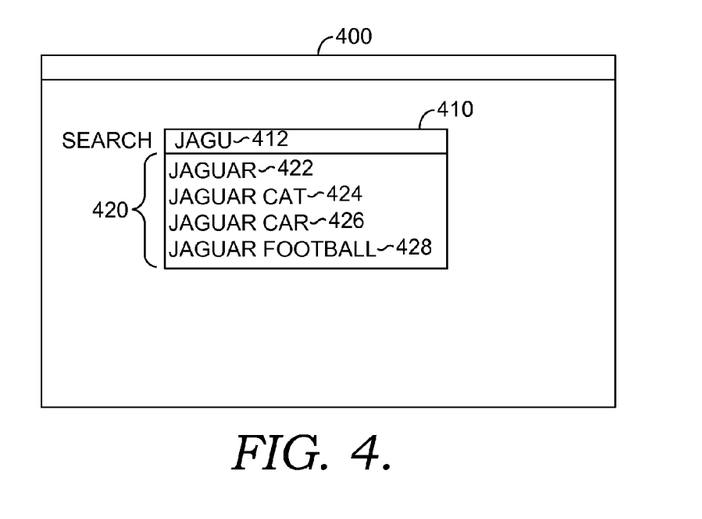
FIG. 4 is a diagram of a search interface that shows topical query suggestions and auto-complete queries in response to a search prefix, in accordance with an embodiment of the present invention.

Turning now to FIG. 4, a search interface 400 showing topical suggestions is shown, in accordance with an embodiment of the present invention. The search interface 400 may be generated by a search front end and displayed in a browser window. Embodiments of the present invention are not limited to displaying the interface in a browser window. The interface 400 includes a search input box 410. The letters "jagu" 412 are entered within the search input box 410. The letters "jagu" 412 is an example of a search prefix. As mentioned previously, a search prefix comprises one or more characters entered into a search input box prior to submitting the query.

Beneath the search input box, a search assistance box 420 is shown. The search assistance box 420 includes an auto-complete query "jaguar" 422. An auto-complete query may be a popular query that starts with the search prefix entered into the search box. The auto complete query is an full query that the user may select instead of submitting their query.

The search assistance box 420 also includes three topics that the user may select. The topics include jaguar cat 424, Jaguar car 426, and Jaguar football 428. The user may select any of these topics and then receive search results that are responsive to jaguar and within the selected topic. For example, if the user selected jaguar cat 424, search results that were responsive to jaguar and related to the topic cat would be shown. In this case, the topics are shown with the auto-complete query as a pair. In another embodiment, the topics may be shown without the auto-complete query. For example, the search assistance box could list "football," "car," and "cat" instead of "jaguar football," "jaguar car," and "jaguar cat."

Figure 5:
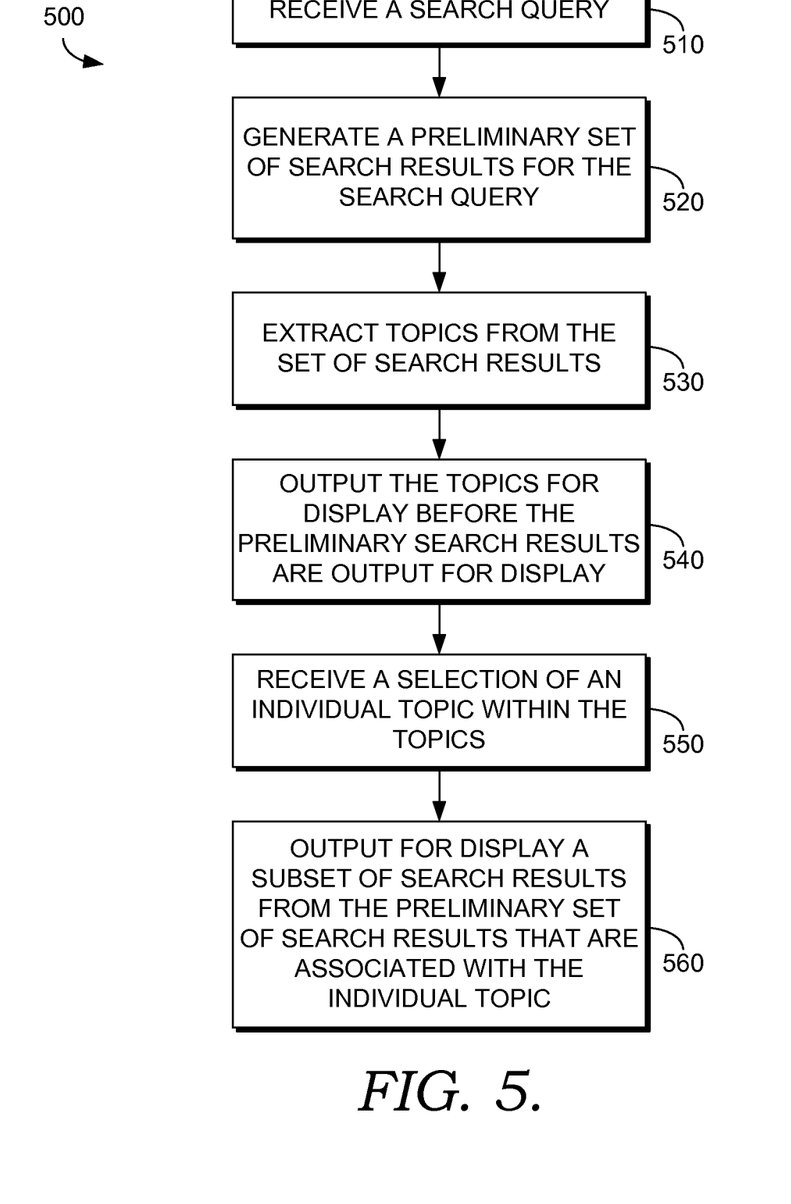
FIG. 5 is flow chart showing a method of generating topical query suggestions, in accordance with an embodiment of the present invention.

Turning now to FIG. 5, a flowchart showing a method 500 of generating topical query suggestions is shown, in accordance with an embodiment of the present invention. A topical query suggestion gives a user one or more topics to select in combination with their query or instead of their query. At step 510, a search query is received. The search query may be an auto-complete search query generated based on a search prefix input into a search interface by a user. In another embodiment, the search query is input into the search interface but not submitted for searching.

At step 520, a preliminary set of search results are generated. The preliminary set of search results are responsive to the search query. The preliminary set of search results may be generated by a search engine. The preliminary set of search results may comprise a threshold number of the total responsive search results returned by a search engine (which can easily number in the thousands). For example, the top 50 search results returned by a search engine may form the set of search results. The search results may be ranked by relevance before applying the threshold to form the set of search results. Thus, the preliminary set of search results may be the 50 highest ranked search results.

At step 530, topics are extracted from the set of search results. In one embodiment, the topics are extracted using a natural language processing technique. In one embodiment, the topics are extracted by applying the natural language processing technique only to metadata associated with the search results. Examples of metadata include a uniform resource locator ("URL") and a title of the search result. Other metadata includes keywords associated with the search results, and summary text (i.e., a small excerpt shown with the search result). In another embodiment, the content of the web pages or documents is analyzed instead of or in addition to the metadata.

At step 540, the topics are output for display. The topics are output for display before the preliminary search results are output for display. In other words, the user is presented the one or more topics before any search results are displayed to the user. In one embodiment, the topics are displayed to the user in a dropdown query assistance box, such as the one described previously with reference to FIG. 4. Other interfaces are possible. For example, the user may be presented with a topic selection interface that allows the user to select one or more topics.

At step 550, a selection of an individual topic within the topics is received. A user may select a topic by clicking on it. The selection may be communicated from a search interface to a search engine, which uses the selection to return relevant results. At step 560, a subset of search results from the preliminary set of search results that are associated with the individual topic are output for display. The subset of search results may be selected by the search engine. If there are less than a threshold number of search results within the preliminary set of search results that conform with the selected topic, then additional search results that do not relate to the topic may be presented at the bottom of the search results page. For example, a search results page may show ten search results to the user. If only seven search results are available that are related to the selected topic, then they are shown at the top of the search results page with an additional three search results drawn from one or more other topics. In another embodiment, the search engine seeks additional search results that are responsive to the topic from outside of the preliminary set of search results that were initially generated. This can be accomplished by rerunning the search that was used to generate the preliminary search results and then filtering by the selected topic.

In a further embodiment, the topics are presented for display along with search results even after a topic has been previously selected by the user. In the event the user does not find search results that answer the user's question, the user may select a different topic and the search results would be refreshed based on that topic's selection without the user entering a new query.

Figure 6:
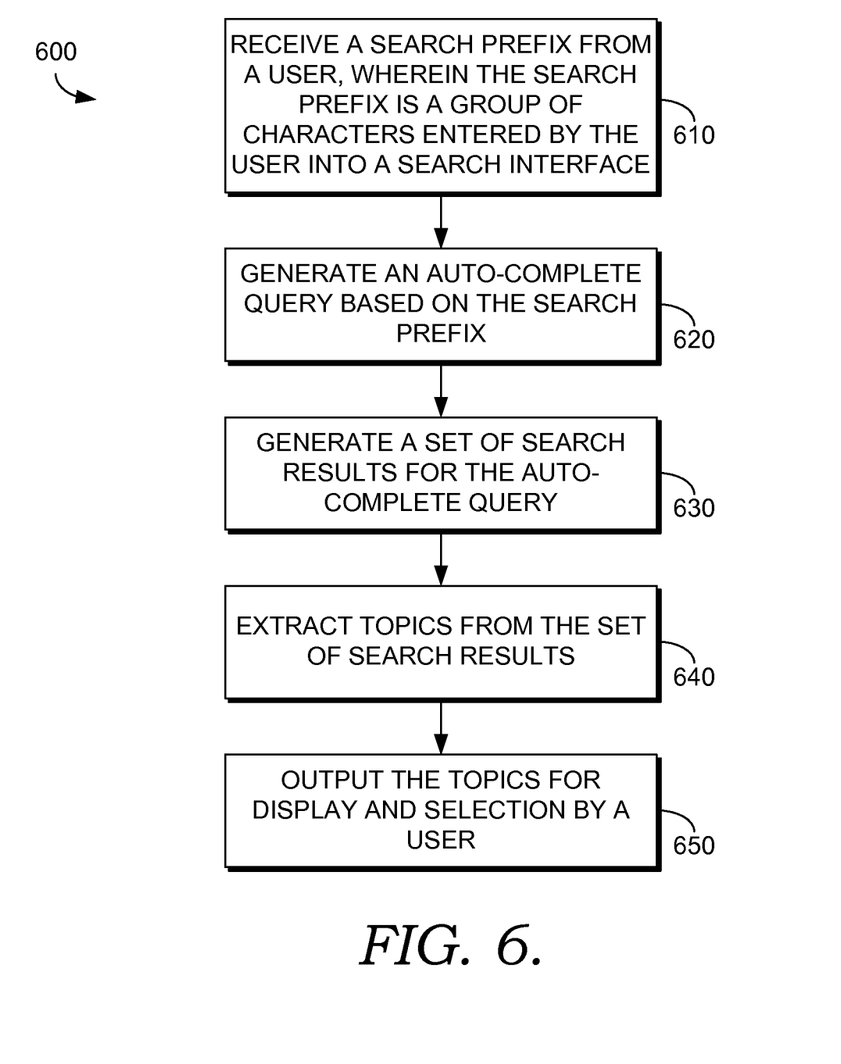
FIG. 6 is flow chart showing a method of generating topical query suggestions from a search prefix, in accordance with an embodiment of the present invention.

Turning to FIG. 6, a method 600 of generating topical query suggestions from a search prefix is shown, in accordance with an embodiment of the present invention. As mentioned previously, the search prefix is a group of characters entered by the user into a search interface. In general, the search prefix is one or more characters less than a complete search query. For example, the characters "jagu" may be a search prefix of the query "jaguar." Thus, a search prefix implies that the search query is in some sense incomplete and that the user is still adding characters. However, in one embodiment, the search prefix may be a complete query, but before the query is actually submitted to the search engine. Once a search query is submitted to a search engine, it becomes a complete query and is no longer a search prefix.

At step 610, a search prefix is received. The search prefix may be received by an auto-complete component. At step 620, an auto-complete query is generated that is based on the search prefix. The generation of an auto-complete query has been described previously.

At step 630, a set of search results that are responsive to the auto-complete query are generated. As mentioned previously, the set of search results may be the 50 most relevant search results that are responsive to the auto-complete query. Fifty is just an example and a different threshold number of search results could be used to generate the set of search results.

At step 640, topics are extracted from the set of search results. As mentioned, a natural language processing technique may be used to extract the topics. In one embodiment, the topics are extracted by analyzing only the metadata associated with the search results. At step 650, the topics are output for display and selection by a user. Once a selection of an individual topic is received, the search results that are responsive to the individual topic may be output for display. This illustrates that the topics are output for display before search results are output for display. In other words, the search results are generated in the background so that topics may be extracted from them, but the initial set of search results are not presented for output for display. In one embodiment, the topics are output for display in combination with one or more auto-complete query suggestions. As an example from FIG. 4, the auto-complete query jaguar could be combined with the topic cat.

Figure 7:
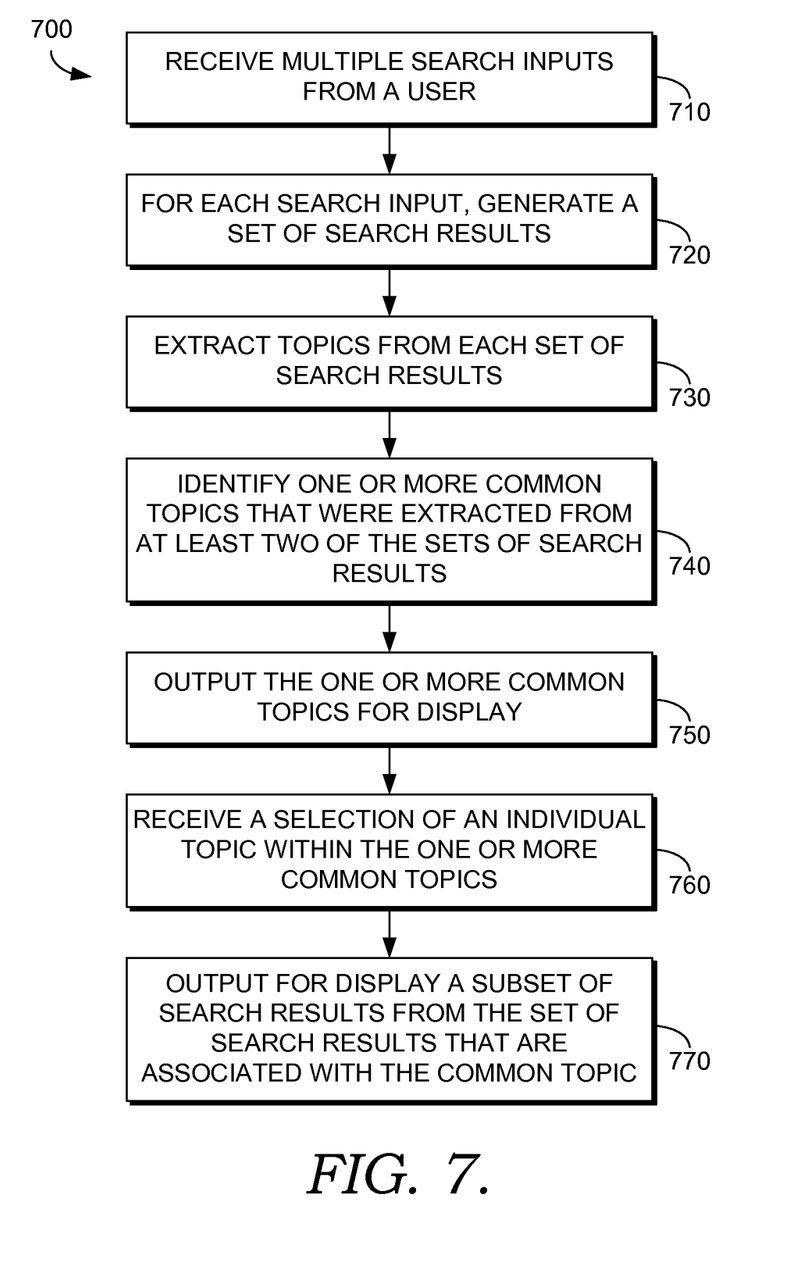
FIG. 7 is a flow chart showing a method of generating topical query suggestions in response to multiple search inputs, in accordance with an embodiment of the present invention.

Turning to FIG. 7, a method 700 of generating topical query suggestions in response to multiple search inputs is shown, in accordance with an embodiment of the present invention. At step 710, multiple search inputs are received from a user. The multiple search inputs are all part of a search session. That the search inputs are all part of a search session may be made explicit by input received from a user. For example, a user may push a button on a search interface, such as one associated with a search toolbar, that indicates a search session is starting. In another embodiment, the delineation of a search session is determined by analyzing a user's online behavior. For example, search inputs submitted in close succession to each other may be determined to be part of a common search session. As time passes between search queries, subsequent search inputs may be associated with a new search session. In addition to specifying that a search session is starting, a user may provide explicit input indicating that a search session is concluded. The search inputs may be a query. In some cases, the query may be submitted to a search engine and results are returned. In this embodiment, the multiple search inputs are a series of searches conducted by a user from the search inputs of step 710.

In another embodiment, the search inputs are portions of text (e.g., words or phrases) explicitly designated by a user as a search input. For example, a user may highlight and click on words within a web page to designate them as search inputs. In one embodiment, a user can drag words and phrases into a search session interface. The words and phrases within a single drop may constitute a single search input. Thus, as the user repeats the drag operation with different phrases, the multiple search inputs are generated.

In another embodiment, the search inputs are keywords that are automatically extracted from a web page a user is viewing. In this way, keywords are extracted from web pages as the user navigates through a series of pages during a search session. The user does not need to explicitly specify any keywords in this embodiment.

At step 720, for each search input, a set of search results is generated. The search results may be generated by a search engine. At step 730, topics are extracted from each set of search results. At step 740, one or more common topics between the sets of search results are identified. The extracted topics may be ranked based on occurrence within the different sets of search results. For example, if a topic is extracted from each of the sets of search results it may be ranked highly. In addition, the number of times a topic occurs within each set of search results may be taken into consideration. Thus, a topic that occurs multiple times in each set of search results may be ranked higher than a topic that occurs only once in each set of search results. In one embodiment, more weight is given to the amount of search result sets from which a topic is extracted than the number of times a topic is extracted from a single set of search results.

At step 750, the one or more common topics are output for display. At step 760, a selection of individual topics within the one or more common topics is received. At step 780, a subset of the search results from the set of search results are output for display by a user. The subset of search results are associated with the individual topic. In one embodiment, the set of search results are not output for display to a user prior to receiving the selection.

In one embodiment, an instruction to start a new search session is received from the user. Search inputs are collected through one or more methods until a user provides an instruction that the search session is complete. At that time, the topics are displayed to the user for selection. The user then selects the topic or topics, and search results responsive to those topics are provided.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage hardware devices having computer-executable instructions embodied thereon that when executed by a computing device perform a method of generating topical query suggestions in response to multiple search inputs, the method comprising:
   receiving multiple search inputs from a user that are all part of a search session;
   for each search input, generating a set of search results, thereby forming a plurality of search results sets;
   extracting topics from each of the set of search results;
   identifying one or more common topics that were extracted from at least two of the plurality of search results sets;
   outputting the one or more common topics for display;
   receiving a selection of an individual topic within the one or more common topics; and
   outputting for display a subset of search results from the set of search results that is associated with the individual topic.

2. The devices of claim 1, wherein the subset of search results is not output for display to the user prior to receiving the selection.

3. The devices of claim 1, wherein the search inputs are portions of text within one or more documents, and wherein designations of the portions of text are received from the user as the search inputs.

4. The devices of claim 3, wherein the method further comprises receiving an instruction from the user to generate the topics after the portions of text were designated.

5. The devices of claim 1, wherein the method further comprises receiving an indication to start a new search session.

6. The devices of claim 1, wherein the method further comprises:
   receiving a selection of an additional topic within the one or more common topics; and
   outputting for display a new subset of search results from the set of search results that is associated with the individual topic and the additional topic.

7. The devices of claim 1, wherein the topics are extracted from the set of search results by performing a natural language analysis on individual search results within the set of search results.

8. The devices of claim 1, wherein the search inputs are multiple search queries submitted during the search session.

9. A computer-implemented method for generating topical query suggestions in response to multiple search inputs, the method comprising:
   receiving multiple search inputs from a user that are all part of a search session;
   for each search input, generating a set of search results, thereby forming a plurality of search results sets;
   at a computing device having a processor and a memory, extracting topics from each of the set of search results;
   identifying one or more common topics that were extracted from at least two of the plurality of search results sets;
   outputting the one or more common topics for display;

receiving a selection of an individual topic within the one or more common topics; and outputting for display a subset of search results from the set of search results that is associated with the individual topic.

10. The method of claim 9, wherein the subset of search results is not output for display to the user prior to receiving the selection.

11. The method of claim 9, wherein the search inputs are portions of text within one or more documents, and wherein designations of the portions of text are received from the user as the search inputs.

12. The method of claim 11 further comprising receiving an instruction from the user to generate the topics after the portions of text were designated.

13. The method of claim 9 further comprising receiving an indication to start a new search session.

14. The method of claim 9 further comprising:
receiving a selection of an additional topic within the one or more common topics; and
outputting for display a new subset of search results from the set of search results that is associated with the individual topic and the additional topic.

15. The method of claim 9, wherein the topics are extracted from the set of search results by performing a natural language analysis on individual search results within the set of search results.

16. The method of claim 9, wherein the search inputs are multiple search queries submitted during the search session.

17. A system for generating topical query suggestions in response to multiple search inputs, the system comprising:
one or more processors;
one or more computer storage media storing computer-executable instructions that, when executed by the one or more processors, cause the one or more processors to:
receive multiple search inputs from a user that are all part of a search session;
for each search input, generate a set of search results, thereby forming a plurality of search results sets;
extract topics from each of the set of search results;
identify one or more common topics that were extracted from at least two of the plurality of search results sets;
output the one or more common topics for display;
receive a selection of an individual topic within the one or more common topics; and
output for display a subset of search results from the set of search results, wherein the subset of search results is associated with the individual topic.

18. The system of claim 17, wherein the set of search results is not output for display to the user prior to receiving the selection.

19. The system of claim 17, wherein the search inputs are portions of text within one or more documents, and wherein designations of the portions of text are received from the user as the search inputs.

20. The system of claim 17, wherein the search inputs are multiple search queries submitted during the search session.

* * * * *